(12) United States Patent
Lin et al.

(10) Patent No.: US 10,758,862 B2
(45) Date of Patent: Sep. 1, 2020

(54) PORTABLE SAMPLING SYSTEM

(71) Applicant: Perma Pure LLC, Lakewood, NJ (US)

(72) Inventors: Yuan Lin, Shanghai (CN); Craig Sunada, Manasquan, NJ (US); Sui Peng, Shanghai (CN); Hamza Mohamed, Lakewood, NJ (US)

(73) Assignee: Perma Pure LLC, Lakewood, NJ (US)

( * ) Notice: Subject to any disclaimer, the term of this patent is extended or adjusted under 35 U.S.C. 154(b) by 227 days.

(21) Appl. No.: 15/847,723

(22) Filed: Dec. 19, 2017

(65) Prior Publication Data
US 2019/0078984 A1 Mar. 14, 2019

Related U.S. Application Data

(60) Provisional application No. 62/558,799, filed on Sep. 14, 2017.

(51) Int. Cl.
| | |
|---|---|
| B01D 53/26 | (2006.01) |
| G01N 1/30 | (2006.01) |
| B01D 69/04 | (2006.01) |
| B01D 71/66 | (2006.01) |
| G01N 1/44 | (2006.01) |
| B01D 51/10 | (2006.01) |

(52) U.S. Cl.
CPC .......... *B01D 53/268* (2013.01); *B01D 51/10* (2013.01); *B01D 69/04* (2013.01); *B01D 71/66* (2013.01); *G01N 1/30* (2013.01); *G01N 1/44* (2013.01); *B01D 2258/0283* (2013.01)

(58) Field of Classification Search
CPC .......... B01D 71/66; B01D 69/04; G01N 1/30
See application file for complete search history.

(56) References Cited

U.S. PATENT DOCUMENTS

| | | | | |
|---|---|---|---|---|
| 5,042,500 A | * | 8/1991 | Norlien | A61B 5/083 128/205.12 |
| H001757 H | * | 11/1998 | Seltzer | 73/863 |
| 6,042,634 A | * | 3/2000 | Van Tassel | G01N 1/2258 95/117 |
| 6,151,953 A | * | 11/2000 | Patashnick | G01N 15/02 73/28.01 |

(Continued)

FOREIGN PATENT DOCUMENTS

| | | |
|---|---|---|
| EP | 0537599 A1 | 4/1993 |
| WO | WO-2013148262 A1 * | 10/2013 |

OTHER PUBLICATIONS

Extended European Search Report issued in EP Application No. 18176323.6 dated Jan. 1, 2019.

*Primary Examiner* — Randy W Gibson
*Assistant Examiner* — Gedeon M Kidanu
(74) *Attorney, Agent, or Firm* — Kaplan Breyer Schwarz, LLP

(57) ABSTRACT

A portable sampling system includes a heated probe, an input/output ("I/O") system, and one membrane dryer in the form of a conduit that couples the probe to the I/O system. The dryer has purge gas flowing over the drying membrane and a gas sample flowing through the drying membrane, which is in the form of tubes of a perfluorosulfonic acid material, and wherein the dryer is operated in some embodiments under deep vacuum and with the purge gas flowing at a rate that is typically less than that of the gas sample being dried.

27 Claims, 4 Drawing Sheets

(56) References Cited

U.S. PATENT DOCUMENTS

| | | | | |
|---|---|---|---|---|
| 6,346,142 | B1* | 2/2002 | Jetter | B01D 53/268 |
| | | | | 96/10 |
| 8,268,055 | B2* | 9/2012 | Smith | B01D 53/268 |
| | | | | 95/45 |
| 2002/0178842 | A1* | 12/2002 | Taylor | G01N 33/2823 |
| | | | | 73/863.12 |
| 2006/0021615 | A1* | 2/2006 | Kertzman | A61M 16/1045 |
| | | | | 128/201.13 |
| 2007/0107594 | A1* | 5/2007 | Piccinini | G01N 1/22 |
| | | | | 95/52 |
| 2008/0282764 | A1* | 11/2008 | Holt | G01N 33/0045 |
| | | | | 73/1.03 |

* cited by examiner

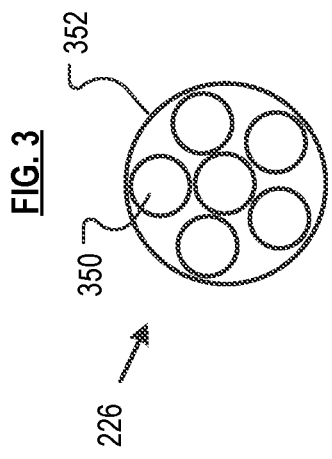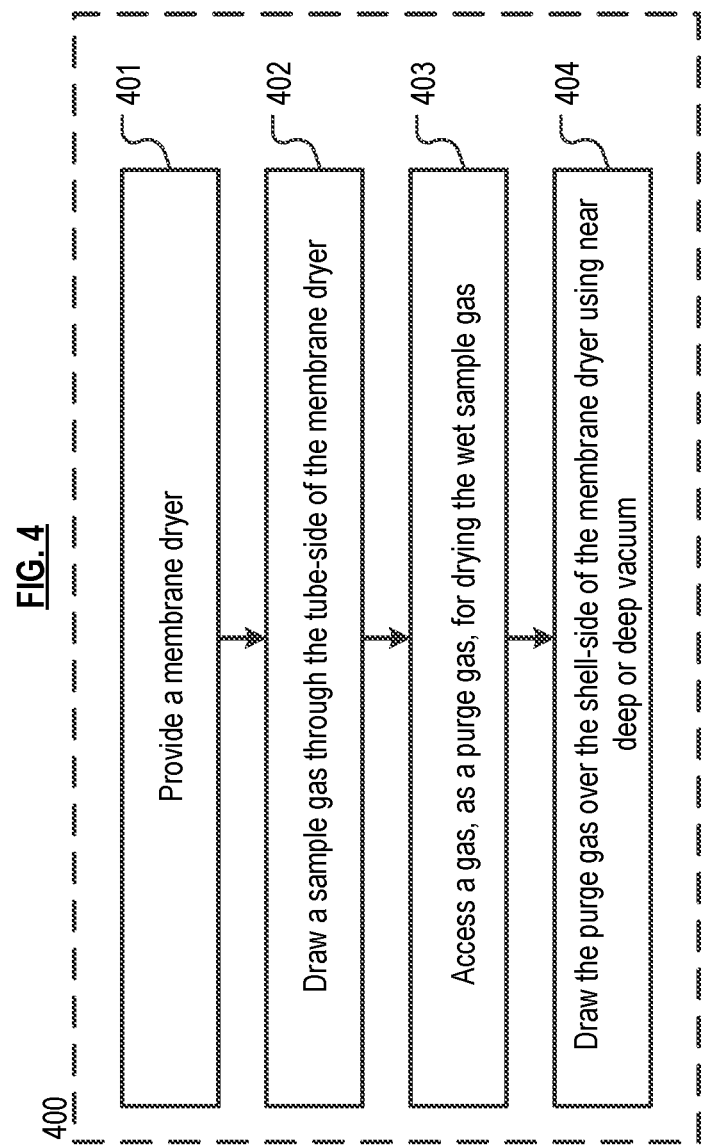

ized to provide proton transport sites and form hydronium ions with water molecules. These water molecules are transported from the sample gas to the purge gas.

PORTABLE SAMPLING SYSTEM

STATEMENT OF RELATED CASES

This case claims priority of U.S. provisional patent application Ser. No. 62/558,799, which was filed on Sep. 14, 2017 and is incorporated herein by reference.

FIELD OF THE INVENTION

This invention pertains generally to gas dehumidification and more specifically to portable devices for drying stack gases.

BACKGROUND OF THE INVENTION

Flue or "stack" gas contains combustion products that are produced when a fuel, such as coal, oil, natural gas, wood or the like is combusted in an industrial furnace, steam-generating boiler, or other large combustion device. These combustion products are released to the air through a flue-gas stack. The combustion products include carbon dioxide, nitrogen, and water vapor, and as well as a small amount of pollutants, including carbon monoxide, oxides of nitrogen and sulfur, and particulates. The levels of certain of these pollutants are subject to regulation and, as such, may require regular monitoring to assure compliance with environmental standards.

Flue gas is often monitored by a continuous emission monitoring system ("CEMS"). A complete CEMS typically includes: (i) sample transport and conditioning equipment, (ii) sample-gas analyzers, and (iii) data-acquisition and reporting equipment. Some CEMS are permanent installations; others include at least some portable elements, such as the sample transport and conditioning equipment.

After a sample of the flue gas is obtained from a stack, it is typically filtered and conditioned by the transport and conditioning equipment to remove moisture and particulates. Such conditioning must not alter the composition of the gas species being monitored in the sample. Filtering and conditioning is important because many sample-gas analyzers require a particulate-free, dry sample gas for reliable and accurate operation. The presence of condensable water vapor and particulates can result in a number of problems, including plugged conduits and flow components, obscured optical-sensing equipment, and can cause pumps, valves and flow meters to fail. Condensed water vapor is particularly problematic because certain components of interest, such as sulfur dioxide, readily dissolve in liquid water. In addition to resulting in an inaccurate (low) reading for sulfur dioxide in the gas stream being analyzed, the dissolved sulfur dioxide reacts with water to form sulfuric acid, which can corrode equipment.

The sample transport and conditioning equipment typically includes a filter, a sample probe, a sample line, and a gas conditioning system. FIG. 1 depicts an embodiment of sample transport and conditioning equipment in the prior art (hereinafter "portable sampling system"). The particular portable sampling system depicted is commercially available from PermaPure, LLC of Lakewood, N.J., as model GASS 35.

As depicted in FIG. 1, portable sampling system 100 includes filter 102, sample probe 104, heated transport line 112, and conditioning system 122, interconnected as shown.

Sample probe 104 obtains a sample of flue gas from the flue stack. The sample probe includes probe shaft (or "stinger") 106 and probe body 108. Probe shaft 106, which is inserted into a flue stack to obtain a sample, comprises a metal, such as stainless steel or Hastelloy, suitable for exposure to high temperatures and the corrosive nature of flue gas. Probe body 108 provides heating, such as via heater 110, to prevent condensation from occurring, which would knock sulfur dioxide out of the gas sample. Filter 102, which is intended to filter out particulates from the flue gas sample, is fitted to the distal end of probe shaft 106 Filter 102 is typically a sintered metal or wire-mesh filter capable of filtering out particles as small as 10 microns.

Heated line 112 fluidically couples sample probe 104 to conditioning system 122. The heated line is typically about 2 to 3 meters (m) in length; this 2 to 3 meters affords a user an ability to place the conditioning system 122 on a supporting surface (e.g., the platform on which the user stands) while raising sample probe 104 as necessary to insert into the flue stack to obtain a sample. The heated line comprises insulated heating jacket 114 and tubing 116, the former enclosing the latter. Heating jacket 114 includes a heating element and thermal insulation. Tubing 116 typically comprises Polytetrafluoroethylene (PTFE) or fluorinated ethylene propylene (FEP). Heated line 112 is controlled to a temperature in the range of about 120 to 180° C. This line is heated for the same reason that sample probe 104 is heated; that is, to prevent condensation.

Salient elements of conditioning system 122 include filtering elements 118, heater 120, two dryers 126A and 126B and two vacuum pumps 128A and 128B, interrelated as shown. Conditioning system 122 also includes a controller (not depicted) to control the operation of certain components of portable sampling system 100.

As previously indicated, sample transport and conditioning equipment, such as portable sampling system 100, must remove moisture from a flue-gas sample. This drying process utilizes a "purge" gas. The source and condition of the gas used as purge gas dictates, to some extent, the layout of the conditioning system. For example, different layouts will be required as a function of whether:

dry instrument air is available for use purge gas;
a portion of the flue-gas sample can be used as a purge gas;
flue gas cannot be used as purge gas, but relatively dry ambient air is available for such purpose and/or the required dew point of the conditioned flue-gas sample is not particularly low; or
flue gas cannot be used as purge gas and the ambient air is relatively wet and/or the required dew point of the conditioned flue-gas sample is very low.

The use of two dryers and two vacuum pumps in conditioning system 122 enables portable sampling system 100 to be used in situations in which relatively wet ambient air is available as the purge gas and the required dew point of the conditioned flue-gas sample is quite low.

Continuing with the discussion of FIG. 1, sample pump 124 draws flue gas sample 101 into sample probe 104, through heated line 112 and into conditioning system 122. Gas sample 101 is filtered via filtering elements 118, which may include a coalescing filter and an ammonia scrubber. Heater 120 heats the inlet line, filtering elements 118, and the first half (of the length) of dryer 126B. The heater includes a temperature sensor (not depicted), which transmits a signal to the system controller (not depicted). Based on the temperature signal, the controller adjusts the temperature as required to maintain a desired temperature in dryer 126B.

Dryers 126A and 126B utilize Nafion™, a sulfonated tetrafluoroethylene based fluoropolymer-copolymer, such as perfluorosulfonic acid (PFSA), tubing. Nafion™ is extremely selective at transferring moisture across its surface, such as from one flowing gas stream (typically on the inside of the Nafion™ tube) to another (on the outside of the tube). Dryer 126A, in conjunction with vacuum pump 128A, functions as a dry purge-gas generator. Dryer 126B, in conjunction with vacuum pump 128B, dries the flue-gas sample 101, using the dry purge gas generated by dryer 126A.

Ambient air 105 is drawn through line 130 into dryer 126A. The dried air exiting dryer 126A is split into two streams: recycle stream 109A and dry purge-gas stream 109B. Recycle stream 109A is drawn, under vacuum, across the "outside" of the Nafion™ tubing within dryer 126A as wet ambient air 105 moves through the inside of the Nafion™ tubing. The difference in the vapor pressure of water between wet ambient air 105 and recycle 109A drives moisture from the ambient air.

Dry purge gas stream 109B is drawn, under vacuum, across the "outside" of the Nafion™ tubing of dryer 126B as gas sample 101 moves through the inside of the Nafion™ tubing. The temperature at the inlet of dryer 126B is controlled to a temperature than is higher than the expected dew point. In some embodiments, the inlet temperature is about 80° C. Dried sample gas 103 exits dryer 126B and leaves conditioning system through line 132 for analysis in the gas analyzers (not depicted).

To remove moisture to desired levels, guidelines provide that the flow rate of purge gas 109B should be from one to three times the flow rate of the flue-gas sample 103 with a recommended vacuum level of 0.4 to 0.5 bar absolute.

Although effective for its intended purpose, there is a drawback to portable sampling system 100; namely, its weight. As a consequence of the location of a sample port on a flue-stack, an operator might be required to carry the portable sampling system up a considerable number of stairs. Due to the presence of two dryers, two vacuum pumps, filters, and heating equipment, conditioning system 122 weighs about 12.5 kilograms (kg). And heated line 112, which has an outer diameter of about 8 to 10 centimeters (cm) due to the presence of the heating element and a significant thickness of thermal insulation, weighs about 4.5 kg or more, depending on its length.

In light of the foregoing, there is a need for an improved method and apparatus to dry gas samples to very low dew points.

SUMMARY OF THE INVENTION

The present invention provides a method and apparatus for drying a gas to very low dew points, wherein the method and apparatus avoid some of the drawbacks of the prior art.

Recognizing that the weight of portable sampling system 100 could be problematic, the present inventors sought to reduce it. The heavy thermal insulation in heated line 112 (which couples sample probe 104 to conditioning system 122) and heater 120 for dryer 126B contributes significantly to the weight of portable sampling system 100. The inventors reasoned that if a portable sampling system for drying a sample gas to very low dew points with a wet purge gas could be designed that had a relatively reduced heating/insulation requirement, a substantial reduction in weight would be achieved.

It occurred to the inventors that if membrane dryer 126B (i.e., the dryer responsible for drying the flue gas sample) were moved to the line that couples the sample probe to the conditioning system, the amount of thermal insulation in that line could be reduced. That is, since the dryer will reduce the dew point of the sample gas, condensation would not occur in the line until the temperature drops to substantially lower temperatures than can be tolerated (without condensation) by heated line 112 of prior-art portable sampling system 100.

In some versions of prior-art portable sampling system 100, dryers 126A/126B comprise 200 tubes of 030 Nafion™ disposed within an outer tube or "shell," each Nafion™ tube having a length of about 30.5 cm (12 inches) and the shell being about the same length. Rather than simply locating a dryer having the aforementioned configuration into heated line 112, the inventors redesigned the dryer so that it would also provide the functionality of heated line 112 (i.e., fluidically couple the sample probe to downstream equipment and provide the requisite 1.5 m or more of length). In particular, in a dryer for use in a portable sampling system in accordance with the present teachings, a much-reduced number of Nafion™ tubes of longer length are used. In the illustrative example, 6 tubes of 050 Nafion™ are disposed within an outer tube or "shell," wherein both the Nafion™ tubes and the shell are about 1.5 to 3 m in length. That is, in a portable sampling system in accordance with the illustrative embodiment, the dryer replaces heated line 112, wherein the length of dryer is substantially equal to that of heated line 112. There are several benefits to this approach.

The Dew Point of the Sample Gas Drops as it Flows Through the Dryer.

Since in accordance with the present teachings, a dryer now replaces heated line 112, the dew point of the sample gas will drop (i.e., moisture levels will decrease) as the gas proceeds through the dryer, moving toward downstream equipment. Therefore, the temperature of the sample can drop to a lower level than for prior-art system 100 without condensation occurring (since in system 100, the sample gas is not dried until after it exits heated line 112 and enters conditioning system 122). As a consequence, the outer tube of the new dryer design requires far less thermal insulation than heated line 112.

Improved Temperature Gradient Across the Dryer.

Temperature has several effects on the performance of Nafion™, the net result of which is that the temperature should be relatively warmer at the inlet to the dryer and relatively cooler at its outlet. Due to the lengthening of the dryer in portable sampling systems in accordance with the illustrative embodiment of the invention, a desirable temperature gradient can be established; better than any gradient that can be established in the significantly shorter dryers of prior-art system 100. So, in addition to the fact that moisture levels drop due to the action of the dryer such that lower temperatures can be tolerated downstream of the probe body, such lower temperatures enable lower dew points to be achieved.

It occurred to the inventors that if a dryer could be operated at deep vacuum levels, such as 0.1 bar absolute pressure or less, the dryer would tend to self-insulate in the manner of a vacuum thermos (i.e., heat loss decreases because conductive heat transfer is greatly reduced). The inventors speculated that the insulating effect of deep vacuum on the purge side of the dryer might keep the sample flue gas warm for a long enough period of time such that moisture would be extracted faster than the temperature drops, thereby preventing condensation from occurring. This could potentially reduce the thermal-insulation requirements of the dryer's shell even further. That, in turn, would further reduce the weight of that dryer relative to heated line 112 of prior-art system 100. However, operating at deep vacuum was expected to be problematic, as follows.

It is known in the art that when using a membrane dryer, such as Nafion™ tubing, a difference in the vapor pressure of water between a sample gas (e.g., on the inside of the tubing) and a purge gas (e.g., on the outside of the tubing) drives moisture from the sample gas to the purge gas. Furthermore, it was understood that there needed to be a significant amount of purge gas to carry moisture away from the outer surface of the Nafion™ tubing to achieve satisfactory drying.

So, placing the outside of the tubing under vacuum increases the vapor pressure gradient of water between the sample gas and the purge gas, as is desirable. Historically, it was believed that to achieve a satisfactorily low dew point (low moisture level) for a warm, moist sample gas, a significant purge-gas flow rate was important—relatively more important than achieving the deepest possible vacuum. In fact, the guidance in this regard was: (1) that the purge gas flow rate should be from 1× to 3× as great as the sample gas flow rate and (2) the nominal vacuum level should be about 0.5 bar absolute. (See, e.g., http://www.permapure.com/products/gas-sample-dryers/pd-gas-dryers/: "Purge gas should be instrument quality air (−40° C. dew point) or nitrogen flowing at two to three times the sample flow rate." It is notable that using, as the purge gas, wet ambient air rather than instrument air, makes it more difficult to achieve low dew points, making purge gas flow rate all the more important in such conditions.)

However, in context of the present invention, the inventors were concerned that the nominal relatively high purge-gas flow rates would cool the dryer too much, increasing the risk of condensation in the dryer. Thus, on the one hand, there was concern about over-cooling and concomitant condensation, and, on the other hand, there was concern that relatively low purge-gas flow rates would impair the dryer's ability to remove moisture, potentially resulting in condensation. So, the inventors were faced with a challenge of how to balance these two competing parameters.

Subsequent testing revealed, quite surprisingly, that at deep vacuum levels (i.e., ≤0.1 bar absolute) and at purge-gas flow rates less than the sample's mass flow rate (e.g., about 15% to 99% thereof), a Nafion™-based dryer was capable of reducing the dew point of the gas sample to less than 4° C., even when the purge gas is hot, humid air.

In fact, as a consequence of using deep vacuum levels and relatively low purge-rate flows in conjunction with the dryer configuration in portable sampling systems in accordance with the present teachings, the system with a single dryer (and a somewhat reduced overall amount of Nafion™) provides more effective drying than the two Nafion™-based dryers in prior-art sampling system 100.

And in terms of size and weight reduction, whereas heated line 112 had an outside diameter of 8 to 10 cm and weighed about 4.5 kg for 2.5 m length, a similar-length dryer in portable sampling systems in accordance with the illustrative embodiment has an outer diameter of about 2.5 to 3 cm and is expected to weigh less than 0.5 kg (the dryer itself weighs about 0.14 kg, the balance representing a short length of insulation and some wires).

Thus, a portable sampling system in accordance with an illustrative embodiment of the present invention includes a heated probe, an input/output ("I/O") system, and one membrane dryer in the form of tube that couples the probe to the I/O system.

The heated probe is somewhat similar to the heated probe of system 100, but in some embodiments, incorporates a vacuum pump capable of reaching deep or near deep vacuum levels. The I/O system, which replaces the conditioning system 122 of system 100, includes, in some embodiments, only the sample pump, tubing, a flow meter, and one or more valves. Because drying no longer occurs in this location, the term "conditioning" does not apply to this collection of equipment (hence the descriptor "I/O"). Recall that prior-art system 100 included two membrane dryers, two vacuum pumps, a heater, a sample pump, associated tubing, a flow meter, and several valves. As a consequence of its reduced equipment complement, the I/O system of the present invention weighs about 2.3 kg, including the housing (in embodiments in which the vacuum pump is in the probe body), as compared to the 12.5 kg weight of conditioning system 122. Additionally, the size of the housing that contains I/O system is less than 50 percent of the size of the housing required for conditioning system 122.

In accordance with some embodiments, the dryer in the portable sampling system is operated such that the purge gas is under "near-deep" vacuum (i.e., greater than 0.1 bar absolute to about 0.2 bar absolute), and more preferably under "deep" vacuum (i.e., 0.1 bar absolute or less). Substantially lower flow rates for the purge gas (as low as about 12% of the gas sample rate on a mass basis) than for prior-art system 100 have been found to provide acceptable drying performance. Optimal performance is provided by the highest purge flow rate that does not cause excessive cooling across the dryer. That maximum purge flow rate is best determined by simple experimentation, and may in fact be limited by the operating characteristics of the pump. However, as a general recommendation, the flow rate of the purge gas should be in the range of about 15% to 99% of the mass flow rate of the sample gas.

BRIEF DESCRIPTION OF THE DRAWINGS

FIG. 3 depicts a cross-sectional view of a membrane dryer for use in the portable sampling system of FIG. 2.

FIG. 4 depicts a method for drying in accordance with an illustrative embodiment of the present invention.

DETAILED DESCRIPTION

The terms below are provided with the following explicit definitions for use in this disclosure and the appended claims:

The term "wet," when used to describe the purge gas or ambient air, means having a dew point in the range of 15 to 30° C.

The phrase "deep vacuum" means a vacuum of 0.1 bar absolute or less.

The phrase "near deep vacuum" means a vacuum of greater than 0.1 bar absolute and less than or equal to 0.2 bar absolute.

The phrase "shell side" of a membrane dryer means the region on the outside of the tubes of the drying membrane (e.g., PFSA, etc.) and inside of the outer tube that contains the tubes of the drying membrane.

The phrase "tube side" of a membrane dryer means the region within the tubes of the drying membrane (e.g., PFSA, etc.).

The phrase "purge gas" means a gas that is introduced to the shell side of a membrane dryer, which is to be swept over the outside of the tubes for assisting in removing moisture from a gas that flows within the tubes.

The phrase "very flexible" means something that is capable of being formed into a loop (i.e., a circle) having a diameter of 8 inches or less.

The term "substantially" means within +/−15 percent of a nominal value. For example, if a first member and a second member are described as being "substantially the same length," then the first member can have a length that is in the range of 15% less to 15% greater than the length of the second member.

The term "about" means within +/−15 percent of a nominal value; that is, synonymous with "substantially."

The term "gas" means one or more gases (a substance having a single defined thermodynamic state at room temperature) and/or one or more vapors (a substance in which the gas phase and liquid phase can co-exist). For example, "flue gas" typically includes both gas and vapor, and more than one of each.

Figure 1:
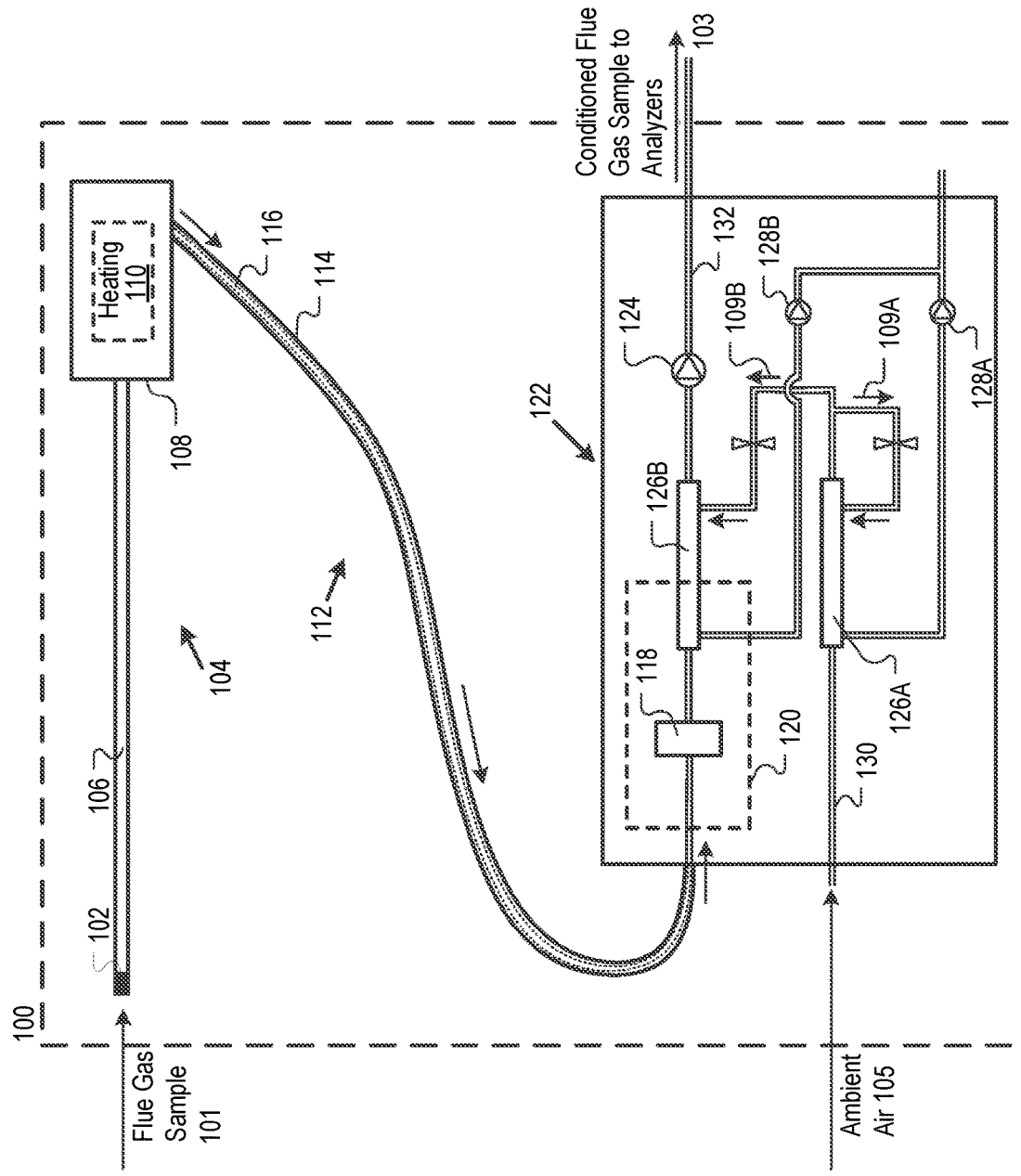
FIG. 1 depicts a portable sampling system in the prior art.
Figure 2:
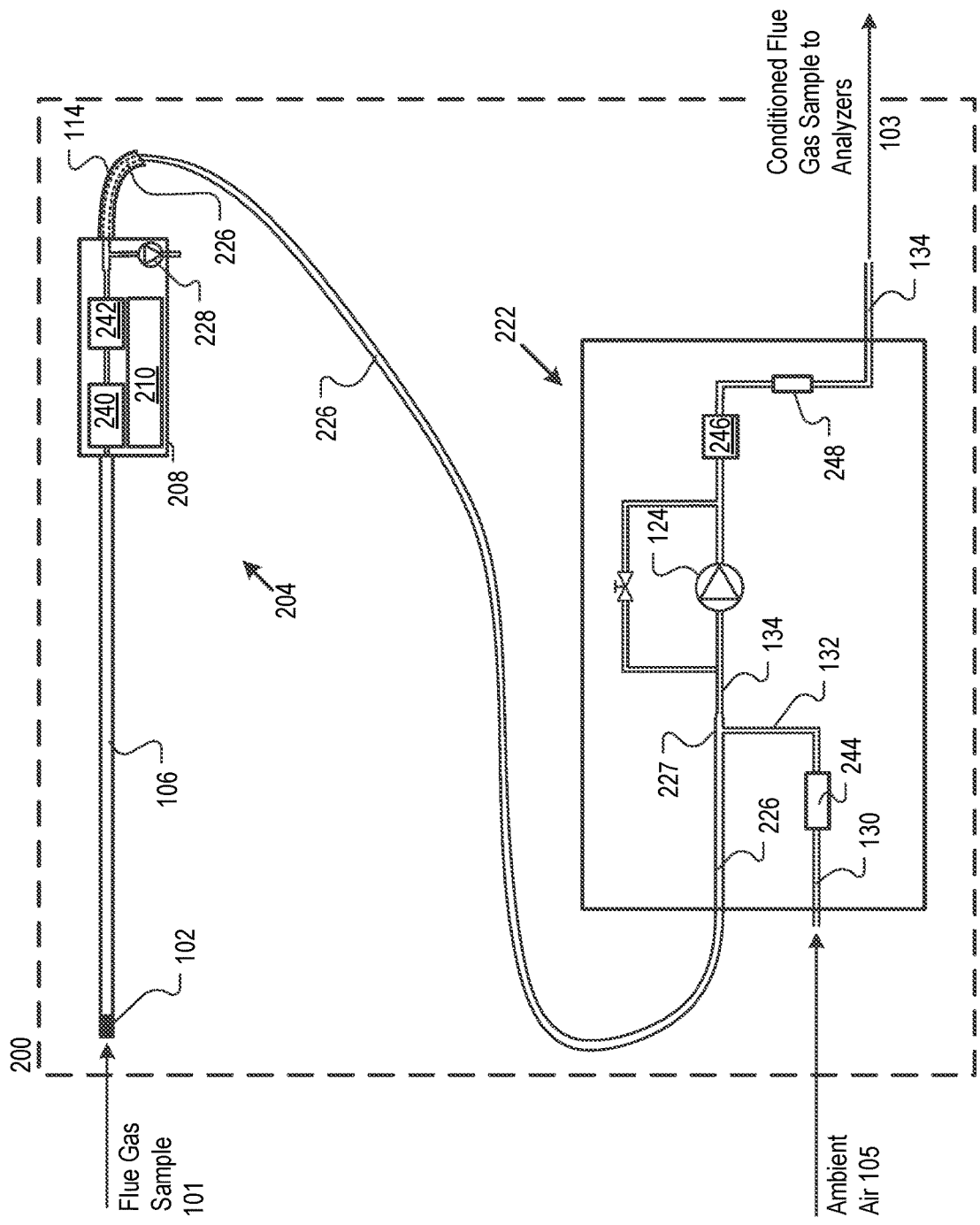
FIG. 2 depicts a portable sampling system in accordance with an illustrative embodiment of the present invention.

FIG. 2 depicts portable sampling system 200 in accordance with the illustrative embodiment of the present invention. The salient features of portable sampling system 200 include sample probe 204, dryer 226, and I/O system 222, interconnected as shown.

Sample probe 204 obtains sample 101 of flue gas from a flue stack (in conjunction with pump 124 in I/O system 222). The sample probe includes probe shaft (or "stinger") 106 and probe body 208. Probe shaft 106, which is inserted into a flue stack to obtain a sample, comprises a metal, such as stainless steel or Hastelloy, suitable for exposure to high temperatures and the corrosive nature of flue gas.

Filter 102, which is intended to filter out particulates from the flue gas sample, is fitted to the distal end of probe shaft 106 Filter 102 is typically a sintered metal or wire-mesh filter capable of filtering out particles as small as 10 microns.

In the illustrative embodiment, probe body 208 includes heater 210, ammonia scrubber 240, optional inlet dew-point sensor 242, and vacuum pump 228. Heater 210 heats the probe body to prevent condensation from occurring, which would knock sulfur dioxide out of the gas sample. Also, heater 210 is used to heat ammonia scrubber 240.

Ammonia scrubber 240 is used to remove ammonia from flue-gas sample 101. The ammonia scrubber protects the downstream gas analyzer from clogging due to the formation of ammonium salts. Ammonia, which is a highly reactive gas, is occasionally added to stack gases to reduce the nitrogen oxide content of the gases by conversion to nitrogen and water. But when present in gas samples, ammonia will readily react with other components in the gas sample, such as sulfur dioxide, to form ammonium salts. This salt is relatively low-boiling, so it is present as a gas at the higher temperatures in the stack. But when the flue-gas sample cools down while passing dryer 226, the salt precipitates out as a solid, clogging the dryer or downstream analyzer.

Ammonia scrubber 240 comprises a polysulfone shell that surrounds a stainless-steel-shell housing or, alternatively, both the shell and housing are stainless steel. The housing contains a phosphoric-based scrubbing media and inert ceramic burl saddles. The water vapor in the sample activates the scrubbing media to produce phosphoric acid. The phosphoric acid reacts with the ammonia, in an acid-base neutralization reaction, producing a phosphate of ammonia. This compound is a solid even at elevated temperatures, and deposits immediately within the ammonia scrubber as a visible salt residue. For proper operation, the ammonia scrubber should be kept at a temperature above the sample dew point to avoid the loss of water-soluble analytes. Heater 240, or a heater integrated (e.g., an electrical resistance strip heater, etc.) with ammonia scrubber 240, is used for this purpose.

Inlet dew point sensor 242, if present, determines the dew point of flue-gas sample 101.

Vacuum pump 228, which is commercially available, is used to pull a near-deep vacuum (i.e., greater than 0.1 bar absolute to about 0.2 bar absolute) or, preferably, a deep vacuum (0.1 bar absolute or less) on the outside of the Nafion™ tubes within dryer 226.

Dryer 226 provides at least a dual functionality; in addition to drying, it fluidically couples the sample probe 204 to I/O system 222 and provides the requisite 1.5 meters or more of length. A short length of heating jacket 114 encloses the first 0.1 m or so of dryer 226 to ensure that no cooling—and hence no condensation—occurs.

In accordance with the present teachings, dryer 226 comprises relatively few tubes (e.g., less than twenty and more typically in the range of 6 to 12 tubes) of a suitable PFSA membrane disposed within a thermally insulated "shell." In the illustrative embodiment, six tubes of 050 Nafion™ (inner diameter of 0.05 inches) is used. In the illustrative embodiment, the shell comprises tubing made of fluorinated ethylene propylene (FEP). In the illustrative embodiment in which six tubes of 050 Nafion™ are used, the FEP tubing has an inner diameter of ⅜ of inch. In some embodiments, both the Nafion™ tubes and the shell are about the same length; in the illustrative embodiment, that length is about 1.5 m, but more generally is in the range of about 1.5 m to 5 m.

FIG. 3 depicts a cross-sectional view of dryer 226, wherein six Nafion™ tubes 350 are disposed within shell 352. In some other embodiments, other PFSA membranes may suitably be used. Furthermore, by virtue of the length of the dryer, the relatively low number of Nafion™ tubes in the dryer, and the low value for Young's modulus of the materials used (i.e., Nafion™ and FEP tubing), the dryer is very flexible.

In conjunction with the present disclosure, those skilled in the art will be able to design, make, and use dryers incorporating PFSA membranes.

The distal end of dryer 226 enters I/O system 222. I/O system 222 includes vacuum pump 124, optional dew point sensor 246, flow meter 248, and particulates filter 244. The I/O system is contained in a housing, typically made of metal or hard plastic.

Through the action of vacuum pump 228, I/O system 222 draws in ambient moist air 105, which serves as the purge gas for dryer 226. In the illustrative embodiment, vacuum pump 228 is situated in probe body 208. However, in some other embodiments (not depicted), vacuum pump 228 is disposed in I/O system 222 rather than the probe body, wherein a tube running alongside dryer 226 conveys the purge gas back to the vacuum pump.

Air 105 is filtered in filter 244, for removal of particulates. Air filter 244, which comprises a fluorocarbon borosilicate glass microfiber element (commercially available from United Filtration Systems of Sterling Heights, Mich. or others), is suitable for removing particulates having a size 1 micron or greater. The filtered air is delivered to distal end 227 of dryer 226 via tubing 132, which includes a flow restriction (not depicted) to throttle the flow of air into the dryer. The flow restriction can be implemented as a hole in a plug (i.e., an orifice), a needle valve, or the like. Alternatively, restriction tubing can be used, with employs a longer length of tubing of larger diameter, which is advantageous because it is less likely to be blocked by a particulate that passes filter 244.

Air 105, which is not dried as in prior-art system 100, is delivered to the "shell" side of dryer 226, passing over the outside of the Nafion™ tubes therein. In some other embodiments, air 105 is subjected to moisture removal, but not via a PFSA-based dryer. For example, in such other embodiments, air 105 is passed through a dessicator or a condensing cooler.

In addition to drawing in ambient air, I/O system 222 outputs the conditioned flue-gas sample 103 to the gas analyzers (not depicted). The conditioned flue-gas sample exits dryer 226 into conduit 134 and is drawn through vacuum pump 124 (which provides the suction for drawing flue gas sample 101 from a flue-gas stack). Conditioned flue-gas sample 103 then passes through in-line optional outlet dew-point sensor 246 (if present), flow meter 248, and exits I/O system 222 to gas analyzers for analysis.

FIG. 4 depicts method 400 for drying a gas stream to a low dew point, such as 4° C. or less, using a wet gas source, such as ambient air. Method 400 can be used for drying flue-gas gas samples, for subsequent analysis, as in the illustrative embodiment. Furthermore, method 400 can be used for any application in which a dry purge gas is unavailable and a gas stream must be dried to low dew points (e.g., 4° C. or less). It is to be understood that although portable sampling system 200 was developed for use with gas sources that are wet (e.g., wet ambient air, etc.), the sampling systems and methods disclosed herein can be used for drying a sample gas when a dry gas source (e.g., dry instrument air, relatively dry ambient air, etc.) is available.

In accordance with operation 401, a membrane dryer is provided. The membrane preferably, but not necessarily, comprises PFSA. As previously noted, PFSA dryers include Nafion™ dryers, among others. A sample gas that requires drying is drawn through the inside of the drying membranes (the tubes of PFSA membrane, etc.), per operation 402. In operation 403, a gas, such as moist ambient air, is accessed for use as the purge gas. The gas is drawn over the shell-side of the membrane dryer at either near-deep or deep vacuum, in accordance with operation 404.

Figure 5:
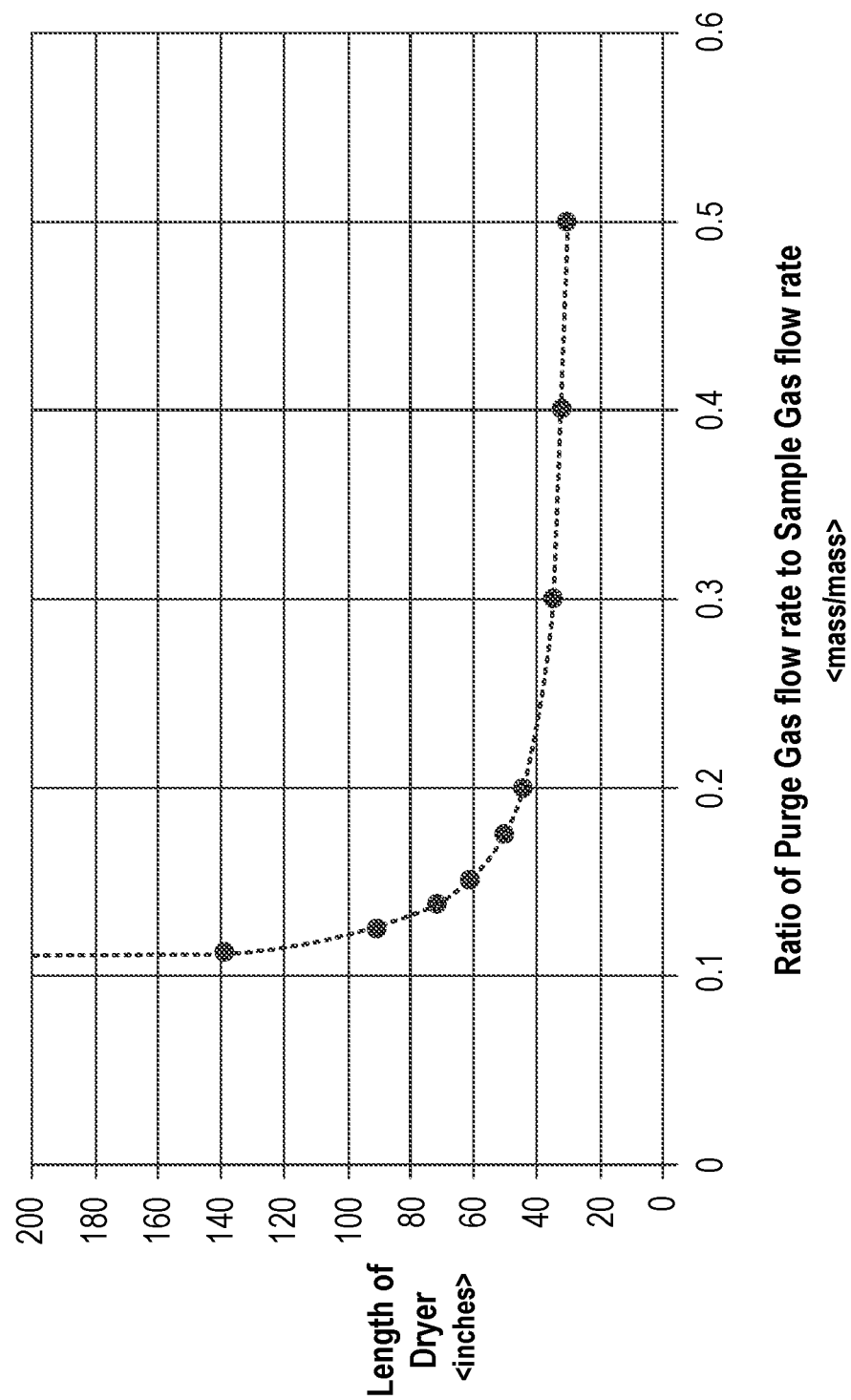
FIG. 5 depicts a plot of dryer length as function of the ratio of the purge-gas flow rate to the sample-gas flow rate.

FIG. 5 depicts a plot of dryer length as a function of the ratio of the mass flow rates of the purge gas to the sample gas ("gas-flow ratio"). More specifically, the y-axis provides the length, in inches, of PD-6T-based dryer required to achieve −10° C. dew point for 1 liter per minute (lpm) of sample gas flow. FIG. 5 is based on the following conditions:
  dryer used: PD-6T (6 tubes of 050 Nafion™ (inner diameter of 0.05 inches));
  vacuum level: deep vacuum (0.1 bar absolute or less) on the outside of the tubes within the dryer;
  sample gas: inlet: 70° C. dew point outlet: −10° C. dew point;
  purge gas: inlet: 15° C. dew point.

FIG. 5 shows that for a PD-6T-based dryer having a length of 1.5 m (59 inches) and under the stated conditions, the target moisture level (i.e., −10° C. dew point) of the sample gas is met, surprisingly, at a gas-flow ratio as low as about 0.15. The length-versus-gas-flow-ratio relation has a generally exponential form at ratios below about 0.2. Per FIG. 5, for PFSA dryers running at 0.1 bar absolute, there is a "knee" in the curve between 0.1 and 0.2 gas flow ratio where performance drops off dramatically and the length of the drying membrane required to achieve acceptably low dew point becomes unacceptably large. A significant amount of performance benefit is achieved by increasing the gas flow ratio to 0.3, but above that, there is a relatively minor performance increase while, at the same time, the size of the vacuum pump increases tremendously due to the increased gas flow.

Assuming the gas-flow ratio remains constant, the length of drying membrane required to reach the target dew point increases linearly with the flow rate of the gas sample. In embodiments in which a PD-6T-based dryer shorter than 1.5m is used, one can reduce the sample flow rate to achieve the target dew point. In this regard, most gas analyzers require 1 lpm of gas flow and, consequently, most portable sampling/conditioning systems are sized for 1.5 lpm (to provide margin for the analyzer).

It will be clear to those skilled in the art that in embodiments in which a dryer contains more than six tubes of 050 Nafion™, the length of the dryer required for a given set of conditions would be reduced relative to a PD-6T dryer. As a first order approximation, the requirement scales linearly. That is, for a Nafion™-based dryer with twice the number of tubes (i.e., twelve) than a PD-6T dryer, the length of the dryer is reduced by a factor of two. The shape of the plot depicted in FIG. 5 applies to all PFSA membrane dryers when purged at 0.1 bar absolute, although for PFSA membranes other than Nafion™, additional tubes or length will required.

There is no specific limitation on the maximum gas-flow ratio, except that, as previously explained, high purge-gas flow rates might cool the dryer to the extent that condensation occurs therein. In that regard, optional dew-point sensor 246 can be used in a control loop that adjusts purge-gas flow rate, such as to optimize the cooling/temperature gradient across the dryer while avoiding any condensation. As previously noted, the flow rate of the purge gas is dictated, to some extent, by the operation of the vacuum pump (i.e., the pump's operating curve). Additionally, as purge-gas flow rates increase, the size of the vacuum pump will increase, as well, incurring cost and weight penalties.

In some embodiments, the gas flow ratio is less than 1 (i.e., the mass flow rate of the purge gas is less than the mass flow rate of the gas sample). More particularly, in some embodiments, the gas flow ratio should be in the range of about 0.12 to about 0.99. In some other embodiments, the gas flow ratio is less than about 0.50. And in some additional embodiments, the gas flow ratio is in the range of about 0.15 to about 0.50. In some preferred embodiments, the gas flow ratio is in the range of about 0.15 to 0.3. In some further embodiments, the gas flow ratio is in a range of about 0.12 to 0.2.

It is to be understood that the disclosure teaches just one example of the illustrative embodiment and that many variations of the invention can easily be devised by those skilled in the art after reading this disclosure and that the scope of the present invention is to be determined by the following claims.

What is claimed:

1. A portable sampling system for sampling gases from a flue stack and removing at least some moisture from the sampled gases, the system comprising:
  a sample probe that withdraws a sample of a gas, wherein the sample probe includes:
    a probe shaft that is dimensioned and arranged to be inserted into the flue stack, and
    a probe body coupled to the probe shaft, wherein the probe body includes a heater;
  an input/output system contained in a housing, wherein the input/output system includes a first vacuum pump that is arranged to provide suction to draw the sample of gas into the sample probe, and further wherein the input/output system
receives and filters gas from the ambient environment to use as a purge gas
a conduit that fluidically couples the sample probe and the input/output system, the conduit comprising a perfluorosulfonic acid membrane in the form of plural tubes, the tubes disposed within a shell in the form of tubing, wherein a portion of the conduit is covered by a heating jacket, wherein the portion is less than about 20% of a total length of conduit; and
a second vacuum pump that draws the purge gas from the input/output system to and through the tubing that composes the shell.

2. The portable sampling system of claim 1 wherein the conduit is very flexible.

3. The portable sampling system of claim 1 wherein the conduit has a length of at least about 1.5 meters.

4. The portable sampling system of claim 1 wherein the second vacuum pump draws a near-deep vacuum in a region defined between the interior of the shell and the exterior of the tubes.

5. The portable sampling system of claim 1 wherein the second vacuum pump draws a deep vacuum in a region defined between the interior of the shell and the exterior of the tubes.

6. The portable sampling system of claim 1 wherein the input/output system does not contain a heater.

7. The portable sampling system of claim 1 and further wherein the second vacuum pump is disposed in the probe body.

8. The portable sampling system of claim 1 wherein the input/output system further includes the second vacuum pump.

9. The portable sampling system of claim 1 wherein the plural tubes comprise less than 20 tubes.

10. A portable sampling system for sampling gases from a flue stack and removing at least some moisture from the sampled gases, the system comprising:
a sample probe that obtains a sample of gas from the flue stack;
an input/output system including a first vacuum pump that provides suction for the sample probe to obtain the sample of gas; and
a conduit that couples the sample probe to the input/output system, the conduit comprising plural tubes of a perfluorosulfonic acid membrane disposed within a shell comprising tubing, the portable sampling system configured so that the sample of gas is received within the plural tubes and a region between the tubing and an exterior of the plural tubes receives a purge gas.

11. The portable sampling system of claim 10 wherein a heating jacket is disposed on a portion of the conduit, and the portion is less than 20% of the length of the conduit.

12. The portable sampling system of claim 10 wherein a heating jacket is disposed on a portion of the conduit, wherein a length of the portion is less than about 0.1 meter.

13. The portable sampling system of claim 10 wherein the input/output system does not include a heater.

14. The portable sampling system of claim 10 wherein the input/output system further includes a filter to filter the purge gas.

15. The portable sampling system of claim 10 wherein the conduit is configured to receive the sample of gas at a first end thereof, which is proximal to the sample probe, and to receive the purge gas at a second end thereof, which is proximal to the input/output system.

16. The portable sampling system of claim 10 wherein the tubes and the tubing have substantially the same length and the conduit has a length in a range of about 1.5 to 3 meters.

17. The portable sampling system of claim 16 wherein the conduit is very flexible.

18. The portable sampling system of claim 10 wherein the sample probe comprises a probe shaft and a probe body.

19. The portable sampling system of claim 18 wherein the probe body includes an in-line ammonia scrubber.

20. The portable sampling system of claim 10 further comprising a second vacuum pump for drawing the purge gas from the input/output system to and through the region between the interior of the shell and the exterior of tubes.

21. The portable sampling system of claim 20 wherein the second vacuum pump draws a near-deep vacuum in the region defined between the interior of the shell and the exterior of the tubes.

22. The portable sampling system of claim 20 wherein the second vacuum pump draws a deep vacuum in the region defined between the interior of the shell and the exterior of the tubes.

23. The portable sampling system of claim 20 wherein the second vacuum pump is disposed in a probe body of the sample probe.

24. The portable sampling system of claim 20 wherein the second vacuum pump is disposed in the input/output system.

25. The portable sampling system of claim 20 wherein the input/output system does not include a heater, does not include a dryer and does not include the second vacuum pump.

26. A portable sampling system for sampling gases from a flue stack and removing at least some moisture from the sampled gases, the system comprising:
a sample probe that obtains a sample of gas from the flue stack;
an input/output system including a first vacuum pump that provides suction for the sample probe to obtain the sample of gas; and
a conduit that couples the sample probe to the input/output system, the conduit comprising plural tubes of a perfluorosulfonic acid membrane disposed within a shell comprising tubing, the portable sampling system configured so that the sample of gas is received within the plural tubes and a region between the tubing and an exterior of the plural tubes receives a purge gas; and
a second vacuum pump, wherein the second vacuum pump draws the purge gas through the region between the tubing and the exterior of the plural tubes, and wherein the second vacuum pump draws a near-deep or deep vacuum in the region.

27. The portable sampling system of claim 26 and further comprising a heating jacket, wherein the heating jacket is disposed on a portion of the conduit and is less than 20 percent of a total length of the conduit.

* * * * *